(12) United States Patent
Kley et al.

(10) Patent No.: US 7,987,673 B2
(45) Date of Patent: Aug. 2, 2011

(54) TURBO-COMPOUND SYSTEM

(75) Inventors: Markus Kley, Ellwangen (DE); Kai Kamossa, Crailsheim (DE)

(73) Assignee: Voith Turbo GmbH & Co. KG (DE)

( * ) Notice: Subject to any disclaimer, the term of this patent is extended or adjusted under 35 U.S.C. 154(b) by 764 days.

(21) Appl. No.: 11/815,053

(22) PCT Filed: Dec. 3, 2005

(86) PCT No.: PCT/EP2005/012958
§ 371 (c)(1),
(2), (4) Date: Apr. 28, 2008

(87) PCT Pub. No.: WO2006/079386
PCT Pub. Date: Aug. 3, 2006

(65) Prior Publication Data
US 2008/0216477 A1    Sep. 11, 2008

(30) Foreign Application Priority Data

Jan. 28, 2005 (DE) .......................... 10 2005 004 058

(51) Int. Cl.
F02G 3/00    (2006.01)
F16H 47/00    (2006.01)
F02B 41/10    (2006.01)
(52) U.S. Cl. ............................. 60/624; 60/614; 74/720
(58) Field of Classification Search .................. 60/624, 60/614, 330, 336; 192/3.28–3.29; 74/720; F02B 41/10
See application file for complete search history.

(56) References Cited

U.S. PATENT DOCUMENTS

| | | | | |
|---|---|---|---|---|
| 2,748,621 | A | * | 6/1956 | Sinclair ........................... 74/720 |
| 3,688,493 | A | | 9/1972 | Cotterill .......................... 60/354 |
| 3,887,048 | A | * | 6/1975 | Jahnel et al. ................. 192/3.28 |
| 4,114,734 | A | * | 9/1978 | Bultmann ..................... 188/274 |
| 4,237,748 | A | * | 12/1980 | Brimmer et al. ............. 74/732.1 |

(Continued)

FOREIGN PATENT DOCUMENTS

| DE | 33 30 315 | 3/1985 |
|---|---|---|
| DE | 39 04 399 | 8/1990 |
| EP | 0 396 754 | 11/1990 |
| EP | 1 473 450 | 11/2004 |

(Continued)

OTHER PUBLICATIONS

A fully Certified English translation of DE 3904399 A1 published on Aug. 16, 1990.*
International Search Report; PCT/EP2005/012958; Mar. 15, 2006.

*Primary Examiner* — Thai Ba Trieu
(74) *Attorney, Agent, or Firm* — Cantor Colburn LLP

(57) ABSTRACT

The invention concerns a turbo compound system, including a crankshaft driven by an internal combustion engine; a blowdown turbine arranged in the exhaust line of the internal combustion engine; a hydrodynamic clutch, including a driving torus and a driven torus, which form with each other a working chamber that is fillable or filled with working fluid; where the driven torus of the hydrodynamic clutch is arranged on a shaft on the crankshaft side, which is in drive connection with the crankshaft and is geared up relative to the crankshaft; and where the driving torus of the hydrodynamic clutch is arranged on a shaft on the blowdown turbine side, which is in drive connection with the blowdown turbine, and where a rotary pump is arranged on the shaft on the crankshaft side or on the shaft on the blowdown turbine side, whose impeller is driven by this shaft.

17 Claims, 1 Drawing Sheet

U.S. PATENT DOCUMENTS

| | | | | |
|---|---|---|---|---|
| 4,715,481 | A | * 12/1987 | Brosius | 188/291 |
| 4,843,822 | A | * 7/1989 | Okada | 60/614 |
| 4,858,440 | A | * 8/1989 | Okada | 60/624 |
| 4,882,906 | A | * 11/1989 | Sekiyama et al. | 60/624 |
| 4,894,992 | A | * 1/1990 | Sekiyama | 60/624 |
| 5,657,838 | A | 8/1997 | Vogelsang et al. | 188/154 |
| 7,694,519 | B2 * | 4/2010 | Kley et al. | 60/624 |
| 2007/0012037 | A1 * | 1/2007 | Kley | 60/330 |
| 2007/0251790 | A1 * | 11/2007 | Klement et al. | 192/3.29 |
| 2007/0272052 | A1 * | 11/2007 | Adleff | 74/720 |
| 2009/0031725 | A1 * | 2/2009 | Schenck et al. | 60/624 |
| 2010/0044127 | A1 * | 2/2010 | Sartre | 475/31 |

FOREIGN PATENT DOCUMENTS

| | | | |
|---|---|---|---|
| GB | 749 294 | | 5/1956 |
| JP | 62093431 | A * | 4/1987 |
| JP | 01257722 | A * | 10/1989 |
| JP | 02125113 | A * | 5/1990 |
| JP | 08260996 | A * | 10/1996 |
| JP | 2002168201 | A * | 6/2002 |
| JP | 2006299908 | A * | 11/2006 |
| JP | 2007085226 | A * | 4/2007 |

* cited by examiner

TURBO-COMPOUND SYSTEM

TECHNICAL FIELD OF THE INVENTION

The invention relates to a turbo compound system, that is, a drive system with an internal combustion engine, in which exhaust energy of the internal combustion engine exhaust is converted to drive energy.

For this purpose, a blowdown turbine is arranged in the exhaust line of the internal combustion engine, which converts exhaust energy to rotational energy, and this rotational energy is transferred to the crankshaft via a hydrodynamic clutch and therefore contributes to driving the crankshaft.

BRIEF DISCUSSION OF RELATED ART

Such turbo compound systems are used, in particular, in motor vehicles, for example trucks, and can additionally have a retarder function, by means of which the vehicle is hydrodynamically braked during so-called deceleration.

The invention concerns, in particular, such combined turbo compound retarder systems.

The known turbo compound systems in the area of the present invention generally have a shaft line that is geared up relative to the crankshaft, on which the hydrodynamic clutch is arranged, based upon the generally desired high rotational speeds of the hydrodynamic clutch, especially in so-called retarder operation.

Generally, the driven torus of the hydrodynamic clutch, that is, the blade wheel of the hydrodynamic clutch, which is arranged on the crankshaft side and on the take-off side in the hydrodynamic clutch during so-called turbo-clutch operation or turbo compound operation, is arranged on a shaft that is in a mechanical drive connection with the crankshaft, for example via a gear train, and is then geared up relative to the crankshaft.

The driving torus of the hydrodynamic clutch, i.e., the blade wheel on the blowdown turbine side or the blade wheel of the hydrodynamic clutch, which is driven during turbo-clutch operation, is in drive connection with the blowdown turbine, for example also via a gear train, which produces a direct mechanical drive connection between the driving torus and the blowdown turbine, i.e., the turbine wheel of the blowdown turbine.

Although the known turbo compound systems already contribute to high efficiency of the drive train, and can also have a retarder function, they are restricted to drive power transmission from the blowdown turbine to the crankshaft, and optionally hydrodynamic braking of the crankshaft. Other components necessary for the reliable functioning of the drive train are arranged separately from the turbo compound system and are dimensioned independently of the turbo compound system, so that no synergistic effects can be achieved.

Document EP 0 396 754 A1 is referred to, in particular, for the prior art.

BRIEF SUMMARY OF THE INVENTION

The underlying task of the invention is to present an improved turbo compound system, especially with a retarder function, which contributes to synergistic effects in the drive train beyond the previous areas of effect of the turbo compound system.

The task according to the invention is achieved by a turbo compound system.

The turbo compound system according to the invention is characterized by the fact that it includes an additional component that is present anyway in drive trains, especially in vehicle drive trains, in its drive connection between the blowdown turbine and the crankshaft and, in so doing, achieves particularly advantageous effects, which will be taken up in detail below, which lead to fuel saving during operation of the internal combustion engine and driving of the vehicle. According to the invention, a rotary pump is arranged in the drive connection between the blowdown turbine and the crankshaft of the turbo compound system, so that this rotary pump is positioned on a shaft that is geared up relative to the crankshaft. High rotational speeds are therefore achieved in the rotary pump, which lead to large power output and/or high efficiency of the rotary pump. The rotary pump can then be the only cooling water pump or one of several cooling water pumps of the cooling system, especially the vehicle cooling system, of the internal combustion engine, or an oil pump, which operates to circulate oil that serves as lubricant for the internal combustion engine or a transmission connected to the internal combustion engine. The oil pump can also be the only oil pump in the drive train or in the vehicle, or one of several oil pumps. Naturally, it is also possible to arrange several rotary pumps, oil pumps and/or water pumps on one or more shafts of the turbo compound system.

According to an advantageous embodiment of the invention, the hydrodynamic clutch and the rotary pump are arranged in a common working fluid loop, so that the pump fluid of the rotary pump, for example oil, water or a mixture with one or both of these substances, is simultaneously the working fluid of the hydrodynamic clutch.

The turbo compound system according to the invention can have a retarder function, that is, it can apply hydrodynamic braking power to the crankshaft of the internal combustion engine during deceleration. For this purpose, either the driving torus of the hydrodynamic clutch can be mechanically locked relative to rotation, for example fixed by a locking brake, or the hydrodynamic clutch has a second working chamber formed by the driven torus and a stator, which is filled during retarder operation with a working fluid, in addition to the first working chamber, for the transfer of torque from the blowdown turbine to the crankshaft during turbo-clutch operation, so that a braking power in the form of negative torque is transferred from the stator to the driven torus by the working fluid.

In the variant with two working chambers of the hydrodynamic clutch, the driven torus advantageously has back-to-back blading, i.e., two bladed partial working chambers connected to each other on the back. Each of these two partial working chambers is supplemented by an additional blade wheel to a whole working chamber, namely, the first partial working chamber by the blade wheel of the driving torus and the second working chamber by the blade wheel or the blading of the stator.

The rotary pump can advantageously be designed integrated with the driving torus or the driven torus of the hydrodynamic clutch, especially in that it is designed in the form of a back-blading on the driving torus and/or driven torus. In a back-to-back arrangement of a turbo-clutch blading and retarder blading in the driven torus, the rotary pump can also be formed between these two bladings in the driven torus.

BRIEF DESCRIPTION OF THE DRAWINGS

The invention will be further described below by means of practical examples and the figures.

In the figures:

FIG. 2 shows a rotary pump, which is arranged on the crankshaft side in a turbo compound system according to the invention, i.e., on the shaft of the driven torus.

DETAILED DESCRIPTION OF THE INVENTION

Figure 1:
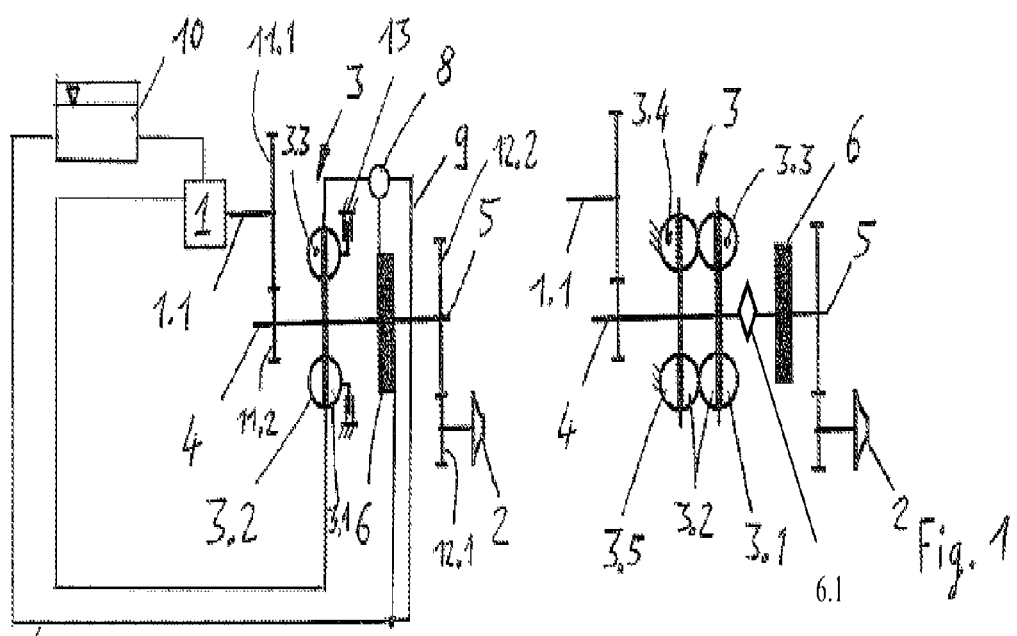
FIG. 1 shows a rotary pump in a turbo compound system according to the invention, which is arranged on the blowdown turbine side on the shaft of the driving torus.
Figure 1:
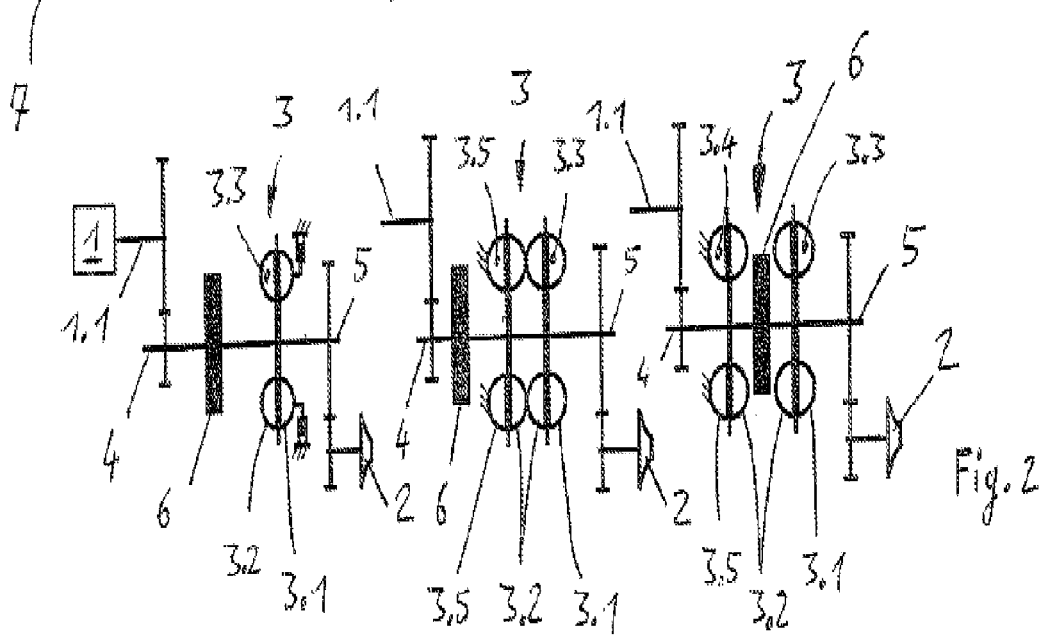

In FIG. 1, the internal combustion engine 1 is apparent, which is in a drive connection with the blowdown turbine 2 via the hydrodynamic clutch 3. In turbo-clutch operation, i.e., during nominal operation of the internal combustion engine 1, power flow occurs from the blowdown turbine 2 via pinion 12.1 and gear 12.2 to the shaft 5 on the blowdown turbine side and therefore the driving torus 3.1 of the hydrodynamic clutch 3, which is carried by the shaft 5 on the blowdown turbine side. At the same time, the rotary pump 6, which is arranged on the shaft 5 on the blowdown turbine side, is placed in pump operation, so that it circulates or pumps the working fluid in the common working fluid loop 7, in which the hydrodynamic clutch 3 and the internal combustion engine 1, as well as a fluid reservoir 10, are also arranged.

From the driving torus 3.1 of the hydrodynamic clutch, the drive energy of the blowdown turbine 2 is transferred by means of circulation flow of the working fluid in working chamber 3.3 of the hydrodynamic clutch 3 to the driven torus 3.2 of the hydrodynamic clutch 3. Since the driven torus 3.2 is arranged on the shaft 4 on the crankshaft side, the rotational power of the blowdown turbine 2 is simultaneously transferred to the shaft 4, which drives the pinion 11.2, which is mounted on the shaft 4 on the crankshaft side. The pinion 11.2 meshes with the gear 11.1, which is carried on the crankshaft 1.1 or is in drive connection with it. The drive power of the blowdown turbine 2 is accordingly transferred to the crankshaft 1.1 of the internal combustion engine 1.

In braking operation, that is, in a braking state, in which the internal combustion engine 1 is in deceleration, the direction of power transfer is opposite that in turbo-clutch operation. The crankshaft 1.1 transfers rotational power to the gear 11.1, which in turn drives the pinion 11.2. The pinion 11.2 therefore drives the driven torus 3.2 of the hydrodynamic clutch 3 via the shaft 4 on the crankshaft side. The driven torus 3.2 transfers rotational power to the driving torus 3.1 by means of the circulation flow in the working chamber 3.3 of the hydrodynamic clutch 3. The driving torus 3.1 is mechanically locked relative to rotational movement by the locking brake 13. The hydrodynamic clutch 3 in this operating state therefore operates as a hydrodynamic retarder, which exerts a braking effect on the crankshaft 1.1.

Owing to the fact that the rotary pump 6, i.e., the impeller 6.1 of the rotary pump 6, is arranged rigidly on the shaft 5 on the blowdown turbine side, which is locked relative to rotation by the locking brake 13, indirectly via the driving torus 3.1, the rotary pump 6 in this operating state cannot carry out any pumping action. The necessary pumping action in the common working fluid loop 7, however, is generated in this operating state by the hydrodynamic clutch 3 operating as a hydrodynamic brake. This has the advantage that drive power is therefore simultaneously taken off, and sufficient cooling of the hydrodynamic clutch 3 is ensured.

According to the depicted variant, a switching device 8 and a bypass 9, the latter guiding the working fluid around the rotary pump 6 or past it, are provided in the common working fluid loop 7, so that in braking operation no fluid flows through the rotary pump 6. According to an alternative variant, however, this bypass and switching device could be dispensed with and the working fluid also guided through rotary pump 6 in braking operation.

In the right half of FIG. 1, an alternative variant to that shown in the left half of FIG. 1 is depicted, which corresponds to the variant just described, except for the design of the hydrodynamic clutch 3. For better understanding, however, details have been left out in this depiction.

The hydrodynamic clutch 3 in this alternative embodiment has two working chambers 3.3 and 3.4. The working chamber 3.4 serves to execute the retarder function of the hydrodynamic clutch 3 and is formed by the driven torus 3.2 and the stator 3.5. In braking operation, this second working chamber 3.4 is filled with working fluid and therefore exerts a braking effect on the driven torus 3.2 and therefore indirectly on the crankshaft 1.1. The first working chamber 3.3, as desired, can either be filled with working fluid, in order to also drive the rotary pump 6 in braking operation, or it is essentially emptied or emptied up to a stipulated residual working fluid amount, so that the retarder part, with the working chamber 3.4 of the hydrodynamic clutch 3, takes over the necessary pumping action for circulation of the working fluid in the common working fluid loop 7.

Three alternative embodiments of the turbo compound system according to the invention are shown in FIG. 2, each of which has an arrangement of the rotary pump 6 on the crankshaft side, i.e., on the shaft 4 on the crankshaft side or in rigid connection with it.

According to the first (left) variant in FIG. 2, the hydrodynamic clutch is provided with a lockable driving torus 3.1 according to the first described variant of FIG. 1. The second (middle) and third (right) variant in FIG. 2 each has a hydrodynamic clutch with two working chambers 3.3 and 3.4, namely, a working chamber 3.3 for the turbo-clutch or hydrodynamic clutch function and a working chamber 3.4 for the retarder or hydrodynamic braking function.

According to the first two variants of FIG. 2, the rotary pump 6, i.e., at least the impeller 6.1 of the rotary pump 6, is mounted directly on the shaft 4 on the crankshaft side.

In the third variant of FIG. 2, the rotary pump 6, i.e., at least the impeller 6.1 of the rotary pump 6, is integrated into the driven torus 3.2 of the hydrodynamic clutch 3, for example between the two blade wheels provided in a back-to-back arrangement in the first working chamber 3.3 or second working chamber 3.4. The rotary pump 6 can be designed, for example, in the form of a back-blading of one or both of these blade wheels of driven torus 3.2.

The depicted back-to-back arrangement in FIGS. 1 and 2 can be designed either by an integral formation of the two blade wheels in a common driven torus 3.2 or, as an alternative, by the rigid connection of the two blade wheels, for example with a rigidly connected shaft.

The invention claimed is:

1. Turbo compound system, comprising:
   a crankshaft driven by an internal combustion engine;
   a blowdown turbine arranged in an exhaust line of the internal combustion engine;
   a hydrodynamic clutch, comprising a driving torus and a driven torus, which form with each other a working chamber that is filled or fillable with working fluid;
   wherein
   the driven torus of the hydrodynamic clutch is arranged on a shaft on the crankshaft side, which is in drive connection with the crankshaft and is geared up relative to the crankshaft;
   the driving torus of the hydrodynamic clutch is arranged on a shaft on the blowdown turbine side, which is in drive connection with the blowdown turbine;
   a rotary pump is arranged on the shaft on the crankshaft side or on the shaft on the blowdown turbine side, whose impeller is driven by this shaft; and
   the rotary pump is arranged in a common working fluid loop with the hydrodynamic clutch, so that the pump fluid of the rotary pump is the working fluid of the hydrodynamic clutch.

2. The turbo compound system according to claim 1, wherein the working fluid is oil or an oil mixture, comprising a lubricant of the internal combustion engine and/or of a transmission connected to the internal combustion engine.

3. The turbo compound system according to claim 1, wherein the working fluid is water or a water mixture, comprising a cooling fluid for cooling the internal combustion engine.

4. The turbo compound system according to claim 1, wherein the driving torus of the hydrodynamic clutch is locked relative to rotation during a deceleration braking operation of the turbo compound system.

5. The turbo compound system according to claim 1, wherein the hydrodynamic clutch additionally has a second working chamber, which is formed by the driven torus and a stator and is filled with a working fluid to produce a hydrodynamic braking effect in a deceleration braking operation of the turbo compound system.

6. The turbo compound system according to claim 5, wherein the driving torus of the hydrodynamic clutch is locked relative to rotation during a deceleration braking operation of the turbo compound system, and wherein the rotary pump is arranged on the shaft on the blowdown turbine side, and the hydrodynamic clutch and the rotary pump are arranged in the common working fluid loop, such that when the driving torus is locked relative to rotation, or when the second working chamber is filled with working fluid, the pumping effect to maintain circulation in the common working fluid loop is produced by the hydrodynamic clutch.

7. The turbo compound system according to claim 6, wherein the rotary pump and hydrodynamic clutch are arranged in series in the common working fluid loop, and, a switching device and a bypass around the rotary pump are provided, in order to feed the working fluid past the rotary pump during braking operation.

8. The turbo compound system according to claim 5, wherein the driving torus of the hydrodynamic clutch is locked relative to rotation during a deceleration braking operation of the turbo compound system, wherein the rotary pump is arranged on the shaft on the crankshaft side, and the hydrodynamic clutch and the rotary pump are arranged in the common working fluid loop, such that when the driving torus is locked relative to rotation, or the second working chamber is filled with working fluid, the hydrodynamic clutch makes a contribution to the pumping effect, in order to circulate the working fluid in the common working fluid loop.

9. The turbo compound system according to claim 8, wherein the rotary pump and the hydrodynamic clutch, and the second working chamber of the hydrodynamic clutch, are arranged in series in the common working fluid loop.

10. The turbo compound system according to claim 1, wherein an impeller of the rotary pump is integral with the driving torus or the driven toms of the hydrodynamic clutch.

11. The turbo compound system according to claim 10, wherein the rotary pump is in a form of a back-blading on the driving torus and/or driven torus.

12. The turbo compound system according to claim 1, wherein the driving torus of the hydrodynamic clutch is geared up relative to the blowdown turbine.

13. Turbo compound system, comprising:
a crankshaft driven by an internal combustion engine;
a blowdown turbine arranged in an exhaust line of the internal combustion engine;
a hydrodynamic clutch, comprising a driving torus and a driven torus, which form with each other a working chamber that is filled or fillable with working fluid;
wherein
the driven torus of the hydrodynamic clutch is arranged on a shaft on the crankshaft side, which is in drive connection with the crankshaft and is geared up relative to the crankshaft;
the driving torus of the hydrodynamic clutch is arranged on a shaft on the blowdown turbine side, which is in drive connection with the blowdown turbine;
and
a rotary pump is arranged on the shaft on the crankshaft side or on the shaft on the blowdown turbine side, whose impeller is driven by this shaft;
wherein the hydrodynamic clutch additionally has a second working chamber, which is formed by the driven torus and a stator and can be filled with a working fluid to produce a hydrodynamic braking effect in a deceleration braking operation of the turbo compound system.

14. The turbo compound system according to claim 13, wherein the driving torus of the hydrodynamic clutch is locked relative to rotation during a deceleration braking operation of the turbo compound system, and wherein the rotary pump is arranged on the shaft on the blowdown turbine side, and the hydrodynamic clutch and the rotary pump are arranged in the common working fluid loop, such that when the driving torus is locked relative to rotation, or when the second working chamber is filled with working fluid, the pumping effect to maintain circulation in the common working fluid loop is produced by the hydrodynamic clutch.

15. The turbo compound system according to claim 14, wherein the rotary pump and hydrodynamic clutch are arranged in series in the common working fluid loop, and a switching device and a bypass around the rotary pump are provided, in order to feed the working fluid past the rotary pump during braking operation.

16. The turbo compound system according to claim 13, wherein the driving torus of the hydrodynamic clutch is locked relative to rotation during a deceleration braking operation of the turbo compound system, wherein the rotary pump is arranged on the shaft on the crankshaft side, and the hydrodynamic clutch and the rotary pump are arranged in the common working fluid loop, such that when the driving torus is locked relative to rotation, or the second working chamber is filled with working fluid, the hydrodynamic clutch makes a contribution to the pumping effect, in order to circulate the working fluid in the common working fluid loop 17. The turbo compound system according to claim 16, wherein the rotary pump and the hydrodynamic clutch, and the second working chamber of the hydrodynamic clutch, are arranged in series in the common working fluid loop.

* * * * *